US010728028B2

(12) United States Patent
Samid

(10) Patent No.: US 10,728,028 B2
(45) Date of Patent: Jul. 28, 2020

(54) TRANSMITTER FOR ENCODING INFORMATION WITH RANDOMLY FLIPPED BITS AND TRANSMITTING THAT INFORMATION THROUGH A COMMUNICATIONS CHANNEL

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 16/328,017

(22) PCT Filed: Nov. 6, 2017

(86) PCT No.: PCT/US2017/060188
§ 371 (c)(1),
(2) Date: Feb. 25, 2019

(87) PCT Pub. No.: WO2018/085771
PCT Pub. Date: May 11, 2018

(65) Prior Publication Data
US 2019/0268146 A1 Aug. 29, 2019

Related U.S. Application Data

(63) Continuation-in-part of application No. 15/436,806, filed on Feb. 18, 2017, now abandoned.
(Continued)

(51) Int. Cl.
*H04L 29/06* (2006.01)
*H04L 9/08* (2006.01)
*H04L 9/06* (2006.01)

(52) U.S. Cl.
CPC ............ *H04L 9/0852* (2013.01); *H04L 9/065* (2013.01)

(58) Field of Classification Search
None
See application file for complete search history.

(56) References Cited

U.S. PATENT DOCUMENTS 6,845,159 B1 * 1/2005 Domstedt ............. H04L 9/0618
380/264
9,635,011 B1 * 4/2017 Wu ...................... H04L 63/0807
(Continued)

FOREIGN PATENT DOCUMENTS

WO 2014101087 A1 7/2014
WO 2015112167 A1 7/2015

OTHER PUBLICATIONS

Amounas, Fatima; El Kinani, El Hassan. Secure encryption scheme of amazigh alphabet based ECC using finite state machine. 2013 National Security Days (JNS3). https://ieeexplore.ieee.org/stamp/stamp.jsp?tp=&arnumber=6595477 (Year: 2013).*
(Continued)

*Primary Examiner* — Jeremiah L Avery

(57) ABSTRACT

A transmitter encodes information with randomly flipped bits. A cipher key that includes for each letter of an alphabet a unique string of binary bits of length N and a total amount of bits M to be randomly flipped where M<N are stored using a secure memory. An information message that includes a series of one or more letters is received using a transmitter. The cipher key is read from the secure memory and at least one letter of the series is converted to a corresponding unique string of binary bits of length N. The total amount of bits M to flip are read from the secure memory, the M bits of the unique string are randomly selected, and the M bits are flipped to the opposite binary value. The string with M flipped bits is transmitted through a communications channel.

15 Claims, 6 Drawing Sheets

Related U.S. Application Data

(60) Provisional application No. 62/418,217, filed on Nov. 6, 2016, provisional application No. 62/428,464, filed on Nov. 30, 2016, provisional application No. 62/435,772, filed on Dec. 18, 2016, provisional application No. 62/457,162, filed on Feb. 10, 2017, provisional application No. 62/473,324, filed on Mar. 18, 2017, provisional application No. 62/488,763, filed on Apr. 23, 2017, provisional application No. 62/514,905, filed on Jun. 4, 2017, provisional application No. 62/544,848, filed on Aug. 13, 2017, provisional application No. 62/580,111, filed on Nov. 1, 2017, provisional application No. 62/581,752, filed on Nov. 5, 2017, provisional application No. 62/297,127, filed on Feb. 18, 2016, provisional application No. 62/336,477, filed on May 13, 2016, provisional application No. 62/339,921, filed on May 22, 2016, provisional application No. 62/374,804, filed on Aug. 13, 2016.

(56) References Cited

U.S. PATENT DOCUMENTS

| | | | | |
|---|---|---|---|---|
| 2004/0221163 | A1* | 11/2004 | Jorgensen | H04L 63/0428 713/182 |
| 2005/0002531 | A1* | 1/2005 | Michaelsen | G06F 21/602 380/268 |
| 2006/0140401 | A1* | 6/2006 | Johnson | G06F 21/14 380/44 |
| 2006/0220926 | A1* | 10/2006 | Ito | G11B 20/10009 341/50 |
| 2007/0014214 | A1* | 1/2007 | Nozawa | G11B 20/00086 369/47.1 |
| 2011/0194686 | A1* | 8/2011 | Stedron | G09C 1/02 380/28 |
| 2012/0020435 | A1 | 1/2012 | Xu et al. | |
| 2014/0025952 | A1 | 1/2014 | Marlow et al. | |
| 2014/0112469 | A1* | 4/2014 | Layne | H04L 9/0618 380/44 |

OTHER PUBLICATIONS

Seroussi, Gadiel; Weinberger, Marcelo J. Optimal Algorithms for Universal Random Number Generation From Finite Memory Sources. IEEE Transactions on Information Theory, vol. 61, Issue: 3. https://ieeexplore.ieee.org/stamp/stamp.jsp?tp=&arnumber=7000618 (Year: 2014).*

Apparaju, Rakesh; Dr. Agarwal, Suneeta. An Arithmetic Coding Scheme by Converting the Multisymbol Alphabet to M-ary Alphabet. International Conference on Computational Intelligence and Multimedia Applications (ICCIMA 2007). https://ieeexplore.ieee.org/stamp/stamp.jsp?tp=&arnumber=4426467 (Year: 2007).*

International Search Report and Written Opinion for PCT/US17/60188, dated Jan. 17, 2018.

* cited by examiner

TRANSMITTER FOR ENCODING INFORMATION WITH RANDOMLY FLIPPED BITS AND TRANSMITTING THAT INFORMATION THROUGH A COMMUNICATIONS CHANNEL

CROSS-REFERENCE TO RELATED APPLICATION

This application claims the benefit of U.S. Provisional Patent Application Ser. No. 62/418,217, filed Nov. 6, 2016, U.S. Provisional Patent Application Ser. No. 62/428,464, filed Nov. 30, 2016, U.S. Provisional Patent Application Ser. No. 62/435,772, filed Dec. 18, 2016, U.S. Provisional Patent Application Ser. No. 62/457,162, filed Feb. 10, 2017, U.S. Provisional Patent Application Ser. No. 62/473,324, filed Mar. 18, 2017, U.S. Provisional Patent Application Ser. No. 62/488,763 filed on Apr. 23, 2017, U.S. Provisional Patent Application Ser. No. 62/514,905, filed Jun. 4, 2017, U.S. Provisional Patent Application Ser. No. 62/544,848, filed Aug. 13, 2017, U.S. Provisional Patent Application Ser. No. 62/580,111, filed Nov. 1, 2017, and U.S. Provisional Patent Application Ser. No. 62/581,752, filed Nov. 5, 2017, the content of which is incorporated by reference herein in their entireties.

INTRODUCTION

The teachings herein relate to a transmitter for encoding or encrypting information with randomly flipped bits and transmitting that information through a communications channel. More particularly the teachings herein relate to a transmitter and a receiver that each stores the same cipher key and a total amount of bits to randomly flip in each transmitted bit string. The transmitter converts each letter of a message into a bit string using the cipher key and randomly flips bits of each bit string according to the total amount of bits to randomly flip. Each bit string, therefore, transmitted through the communications channel includes randomly flipped bits that make detection of the cipher key difficult. The receiver decodes each bit string received using the same cipher key and the total amount of bits to randomly flip. The systems and methods herein can be performed in conjunction with a processor, controller, or computer system, such as the computer system of FIG. 1.

BACKGROUND

In cryptography, a message sent between a transmitter and a receiver is essentially encrypted by changing the letters of the message to a different representation based on a cipher key known to both the transmitter and receiver. Methods of determining or detecting or cracking the cipher used by a transmitter and receiver generally involve using computational resources to analyze the encrypted messages sent between the two and inferring the cipher from these messages. As a result, a cipher or cryptography method is only as good as the amount of computational resources one would need to figure it out. In other words, increasing the complexity of a cipher or cryptography method only increases the amount of computational resources one would need to figure it out.

This balance between the complexity of traditional encryption methods and the amount of computational resources needed to figure them out will soon be disrupted by the advent of quantum computers. Quantum computers may be able to determine the cipher keys of traditional encryption methods more quickly than was ever expected.

As a result, new encryption methods are needed that are less susceptible to pure computing power. One method that is not susceptible to pure computing power is complete randomness. Of course, a completely random encryption method cannot be decrypted (See Vernam cipher 1917). As a result, systems and methods that introduce an ever larger degree of randomness are needed to improve the communications between a transmitter and receiver.

BRIEF DESCRIPTION OF THE DRAWINGS

The skilled artisan will understand that the drawings, described below, are for illustration purposes only. The drawings are not intended to limit the scope of the present teachings in any way.

Figure 1:
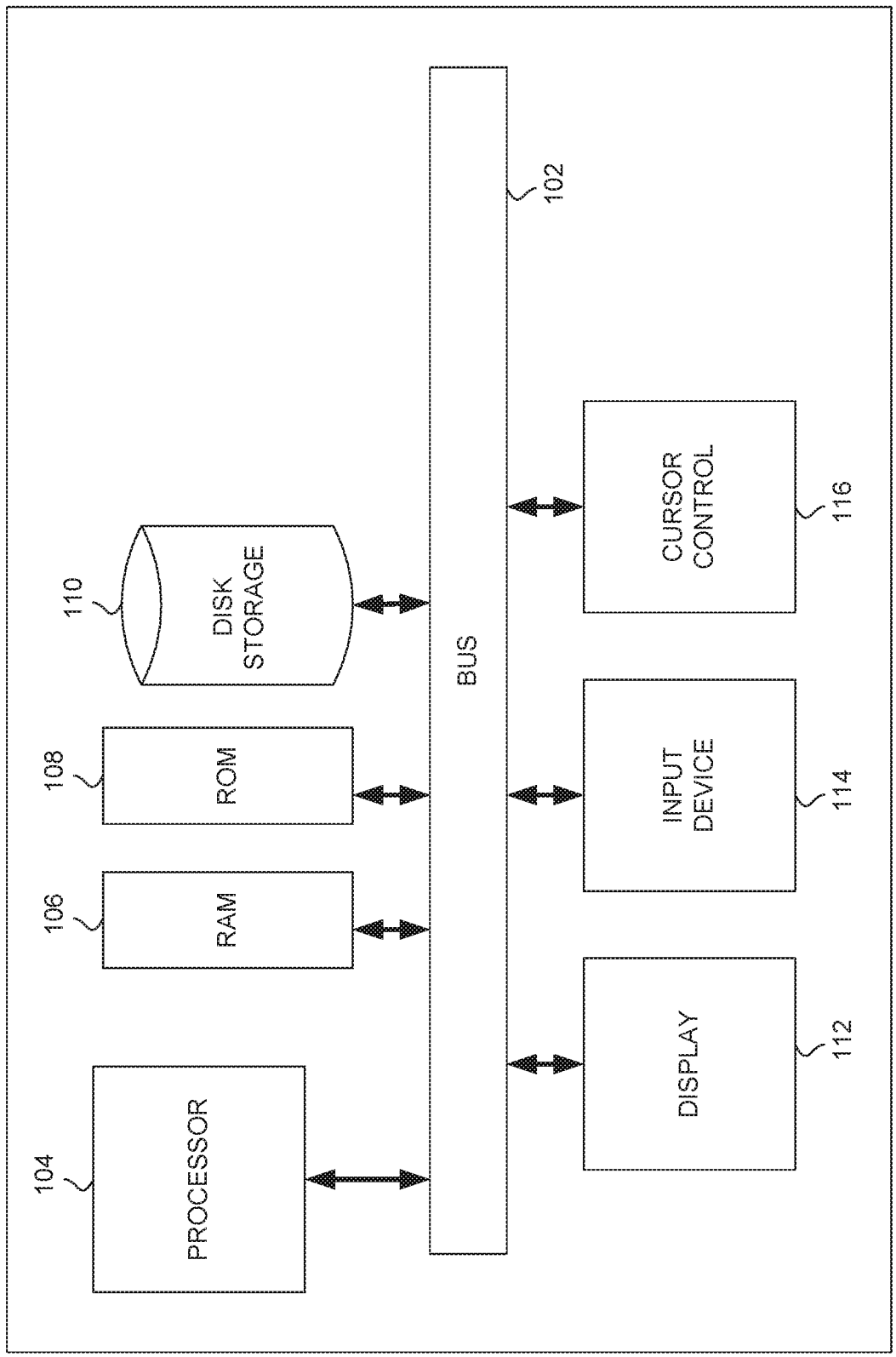
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Glossary alphabet: any collection of symbols (letters) used to compose messages. E.g. binary alphabet, 0, 1; 4 letters alphabet: X, Y, Z, W, which can be mapped to binary: X-00, Y-11, Z-01, W-10, or Base64, or the ASCII table.

letter-key: a bit string comprised of randomly selected N bits.

alphabet-key: the collection of all the keys; fort letters in the alphabet, the alphabet key contains to bits.

ad-hoc randomness: randomness produced on demand in the form of a binary sequence, zeros and ones.

BitFlip: the name of the system and method explained herein based on flipping bits and counting bits.

Randomness in Transmission Methods

As described above, increasing the complexity of a cipher or cryptography method only increases the amount of computational resources one would need to figure it out. This balance between the complexity of traditional encryption methods and the amount of computational resources needed to figure them out will soon be disrupted by the advent of quantum computers. Quantum computers may be able to determine the cipher keys of traditional encryption methods more quickly than was ever expected.

As a result, new encryption methods are needed that are less susceptible to pure computing power. One method that is not susceptible to pure computing power is complete randomness. Of course, a completely random encryption method cannot be decrypted. As a result, systems and methods that introduce an ever larger degree of randomness are needed to improve the communications between a transmitter and receiver.

Silent Signature

In various embodiments, communicating information via a unitary system allows one to silently sign data. A unitary communication system, a communication environment, and a signature procedure are described herein. In the unitary communication system, data is captured by the count of bits, regardless of their identity. For example, the 26 letters of the English alphabet may be associated with 26 integers, say: B=242. O=212. A transmitter transmits a message "BOB" and does so by sending a string of 242 bits followed by a string comprised of 212 bits, followed by another string of 242 bits. The strings are separated by administrative bits, explained ahead: a transmitter could separate between so-called 'payload bits' and 'administrative bits' by expressing bit values via two bits. So payload bits are, for example, 00→0 and 11→1, while administrative bits are 01→0 and 10→1. Now, to communicate the number 3 followed by the number 4 the transmitter sends 00 00 00 10 00 00 00 00 01. The receiver knows that 00 means 0 in payload bits and reads three 0 payload bits followed by 10, which is identified as a separator from the four following zeros (00 00 00 00). The separator communicates to the receiver that it was sent the number 3 then the number 4, as opposed to the number 7. Note that the following messages also communicate 3 followed by 4 because the count of the bits (3) communicates 3 and the count of the second string (4 payload bits) communicates 4. So all the following provide the same: 00 11 00 10 00 11 11 00 01, 11 11 11 10 00 00 00 11 01, 00 00 11 10 00 11 00 00 01.

This method is effective for any message of any length. The communication environment is comprised of n parties sending messages to each other. In particular, where party 1 sends a message to party 2, using the unitary system, the parties are free to decide on the unitary alphabet they use. They can set it up that every letter will be written by a string counting w bit where w is between g bits to h bits. (g<w<h). This means that each communicated letter has at least g bits. The transmitter first writes its message with all the payload bits reading zero. Then the transmitter invokes a source of randomness to flip f<w bits in each payload string. The transmitter keeps a copy of the randomness used to which payload bits to flip. As the message travels to party 2's receiver, it carries on it, the signature 'embossed' on it by the transmitter. The signature, carried by the pattern of flipped bits, will never be duplicated because when the transmitter composes another message it uses a fresh source of randomness to flip the bits in the second message in a different pattern, which is also recorded. In summary, the various messages sent by the transmitter to various receivers, all carry the transmitter signature. If a party suddenly claims that a given message was sent to it by party 1, then party 1 will check with its record and validate the claim if the flip pattern is in his records, and invalidate it otherwise.

Now, consider the case where party 1 sends a message to party 2, with instructions to further send the same message to party 3, which will then have to send the same to party 4, etc. Now each party, $p_i$ may also use ad hoc randomness and flip bits in a particular, and unpredictable pattern before sending it further to party $p_{i+1}$. Obviously, as successive parties randomly flip the payload bits they are likely to flip back a bit that was flipped before by another party. But that is not disturbing in terms of backward accounting. At any moment an inspector can check a given message stored somewhere and ask player $p_i$ who holds it: who sent it to you. The party says party $p_{i-1}$ sent it to me. The inspector finds out from party (i−1) what randomness she used to flip the message to party i, and un-flip those bits in the message as found. Then the inspector will turn to party (i−2) who passed the message to party (i−1), find out what randomness was used by him or her, and unflip the current pattern to account for that stage of flipping. This accounting process goes back to the original writer of the message. If all the flipping accounts well, then the message did indeed make the indicated path. But if the bit status does not agree with the recorded randomness then it is a sign for some errors or forgery of some sort.

It is easy to see that this roll back of random flipping of bits will work even if a party sends a message to several other parties in parallel. If party 1 sends message x to parties 2, 3, and 4, and each of those parties sends the message further, then each version of the same message will undergo different flipping when sent ahead. And such splitting will happen every time a party sends the message to two or more recipients. Alas, all in all an inspector is able to take every copy of the same message and trace back its history to the very original writer of the message. This is analogous to the quantum mechanical concept of the splitting universe. A fraudster that would introduce a message saying he received it properly from a party in the communication environment, will not be able to sustain his claim because a fraudulent message has no record of being sent and being flipped by other parties. While a bona fide party is able to prove the authenticity of his message by allowing one to trace the message through its various receivers up to its originator.

For a sufficiently large w, the number of strings that flip a variable number off bits is $2^w$, but even if the number of flipped bits is fixed or characteristic of the transmitter w can be selected to insure a sufficiently large number of flipping options to insure no practical chance for a good guess by a fraudster.

BitFlip Authentication

This embodiment is concerned with a verifier party who is approached by a prover. The prover wishes to prove to the verifier his bona fide, so that the two can exchange consequential messages. Traditionally the prover and the verifier shared an authentication secret, simply called a secret. The prover will send the secret to the verifier to prove its credentials. This protocol has proven deficient on man-in-the-middle attack where a hacker would listen in, pick up the secret and use it the next time around to fraudulently prove to the verifier his bona fide. The solution to this attack has been a complicated prover-verifier dialogue (E.g. The EMV protocol) where the information used in the proving session is never repeated, so it is pointless for the hacker to glean the information from a given exchange. There are difficulties with this solution. First, it relies on algorithmic complexity which is inherently vulnerable to advanced mathematical insight that would nullify it. Second, it is cumbersome and slow as known to anyone waiting for 10 or 20 seconds for an EMV authenticated transaction to be verified. Third, it requires heavy-duty computing capability, which is non existing in many devices in the Internet of Things where such authentication is crucial. Fourth, this EMV like dialogues drain the scarce resources of battery way too fast.

Various embodiments remedy all four vulnerabilities mentioned above: it is not based complex on hackable math, it is fast, not slow, it requires most basic computing power, and is battery friendly. In fact, its simple computing capacity will also prevent it from being taken over by a hacker to be used as a full-fledged computing node to effect a denial of service attack or alike.

In various embodiments, the verifier and the prover share a secret in the form of a bit string of size s bits. When the prover wishes to prove his bona fide, namely his possession of the shared secret, then he flips a known number of bits, say, f. The flipping of the bits must be carried out randomly. That is the prover needs to exploit a high-quality randomness source to guide it to determine which are the f bits to be flipped. Having flipped the f bits out of the s bits string, the prover then communicates the flipped string to the verifier. The verifier then compares the communicated flipped string to the shared secret. If the verifier finds out that exactly f bits have been flipped, then it would conclude that the party on the other side of the channel is the prover.

Upon accepting the prover claim to be who it says it is, the two parties will engage in the session for which the prover identified himself for. This session can be carried out using some agreed upon cipher, and agreed upon shared secret. That shared secret can be the one used for the flip count, or a different one. But it is also possible for the two parties to use the shared secret that was the randomness that determined the identity of the f flipped bits. To recall the selection of the f bits to be flipped was carried out on the basis of ad hoc randomness that was generated just when needed (so that it is not pre-stored, and hence cannot be hacked). When the prover sent the flipped string to the verifier, it also sent to it the identity of the randomness that determined these f bits to be flipped. This randomness can be used as a session key for the communicating parties.

When the session ends, the verifier should keep a copy of the flipped string. And the next time someone claims to be the prover and initiates the same protocol, the verifier will as before check if the sent string is f bits flipped compared to the shared secret. If the number of flipped bits is anything different from f, more flipped bits or fewer flipped bits then the prover is rejected as hack attempt. If the number of flipped bits is exactly f, then the prover will compare the new flipped string to the past flipped strings that are being stored by the verifier. This comparison is important to prevent replay of a previous string. Using the man-in-the-middle attack, a hacker will pick up a bona fide flipped string and try to cheat the verifier with it. By comparing any new flipped string to previous ones the verifier prevents such re-play attack.

If the verifier is a small internet of things (TOT) device with limited memory then it would be necessary to switch to another shared secret when the memory of past flipped strings is getting full.

This authentication procedure can be augmented by sharing some t secrets, each of size s bits between the verifier and the prover. For t=2, 3, . . . the procedure will augment as follows. The prover will invoke a randomness source to randomly select one of the t shared strings, and practice the above procedure over that particular shared secret.

The verifier on his part will not know which of the shared t secret was flipped, so the verifier will check the communicated flipped string one by one against every one of the shared secrets. If there is at least one of the t shared secrets for which the secret is f flipped bits away from the communicated string then the verifier will conclude that the prover is bona fide. It will reject the attempting prover otherwise.

For any reason, if the verifier is suspicious of the prover, it may insist on repeating this procedure any number of times. A bona fide prover should never fail. Also, the prover and the verifier may exchange places, so that the verifier will now become the prover towards the prover who will become a verifier.

If the shared secret or secrets is perfectly random, and the sharing took place online, and if the flipping choice is perfectly random, then the best hacking strategy is brute force. The brute force defense is directly proportional to the size of the shared secret. As the shared secret grows the effort to compare the bits is linearly growing, but it is so much cheaper and simpler relative to today's practice that this is not a real concern.

The selection of the value off may be fixed between the parties or the verifier may dictate it to the prover before each session. It computes that the greater brute force security takes place if f is close or exactly half the size of the shared secret.

BitFlip Encryption

In various embodiments, communication between a transmitter and receiver is encrypted for transmission through an insecure channel. The transmitter and receiver both have access to the same secure cipher key. The cipher key includes a "plaintext alphabet" comprised of T letters. Each of these T letters in the cipher key is associated with a random bit string comprised of N bits each. This bit string is, for example, called the key for that letter. The resultant TxN bit array amounts to the encryption and decryption total key for all the T letters in the alphabet.

The transmitter receives a message in the shared plaintext alphabet and replaces each letter in the message with an N bit string derived from the cipher key. The transmitter and receiver also agree on the number of bits M to be flipped in each N bit string. The transmitter then uses ad hoc randomness to randomly choose the identity of the M bits to be flipped (here as before the term identity is not referring to one or zero but to its position in the string). Having flipped the M bits, the transmitter sends each N bit string with M flipped bits to the receiver.

The receiver compares each N bit string received to each N bit string in its cipher key to determine that letter. The receiver also has access to the total number of flipped bits M in each N bit string. Therefore, the receiver knows that exactly N–M bits should match the encrypted letter in the cipher key and no other. If an incoming N bit string does not fit to any letter key, that is it is not M flipped bits away from any letter key, then the receiver concludes that this N bit string is a decoy, or belongs to another cipher, but at any rate is of no interest and of no consequence with respect to the secret cipher used. In other words, the receiver ignores an incoming string that does not fit with any existing key.

If the incoming flipped N bit string matches to a certain single letter in the plaintext alphabet the cipher key, the receiver concludes that the transmitter meant to communicate this letter to the receiver. Matches means that the incoming N bit string is exactly M bits away from the letter key (namely, M bits exactly are opposite—0 and not 1, or 1 and not 0).

If the incoming flipped N bit string matches with more than one letter in the plaintext alphabet, then the receiver, like before, concludes that this string is a decoy, garbage, or belonging to some other scheme, but not related to the practicing communication between the parties.

In various embodiments and because of this so-called, collision option, it is necessary that the transmitter before sending off the flipped N bit string checks whether the string it produced from the intended key via ad hoc randomness is not by chance also M bits away from some other letter in the plaintext alphabet. If that flipped string is also M bits away from another letter key, then the transmitter discards it and uses more ad hoc randomness to construct a different flipped string that is M bits away from the intended letter key. The transmitter checks again if there is a collision—the new flipped string fitting to another letter. If there is a collision, then the transmitter will try again with another flipped string. If there is no collision, then the present flipped string is a good choice and will be sent off to the receiver.

Thereby letter by letter the transmitter communicates a plaintext of any size using the agreed upon plaintext letters to the receiver.

System for Performing BitFlip Encryption

Figure 2:
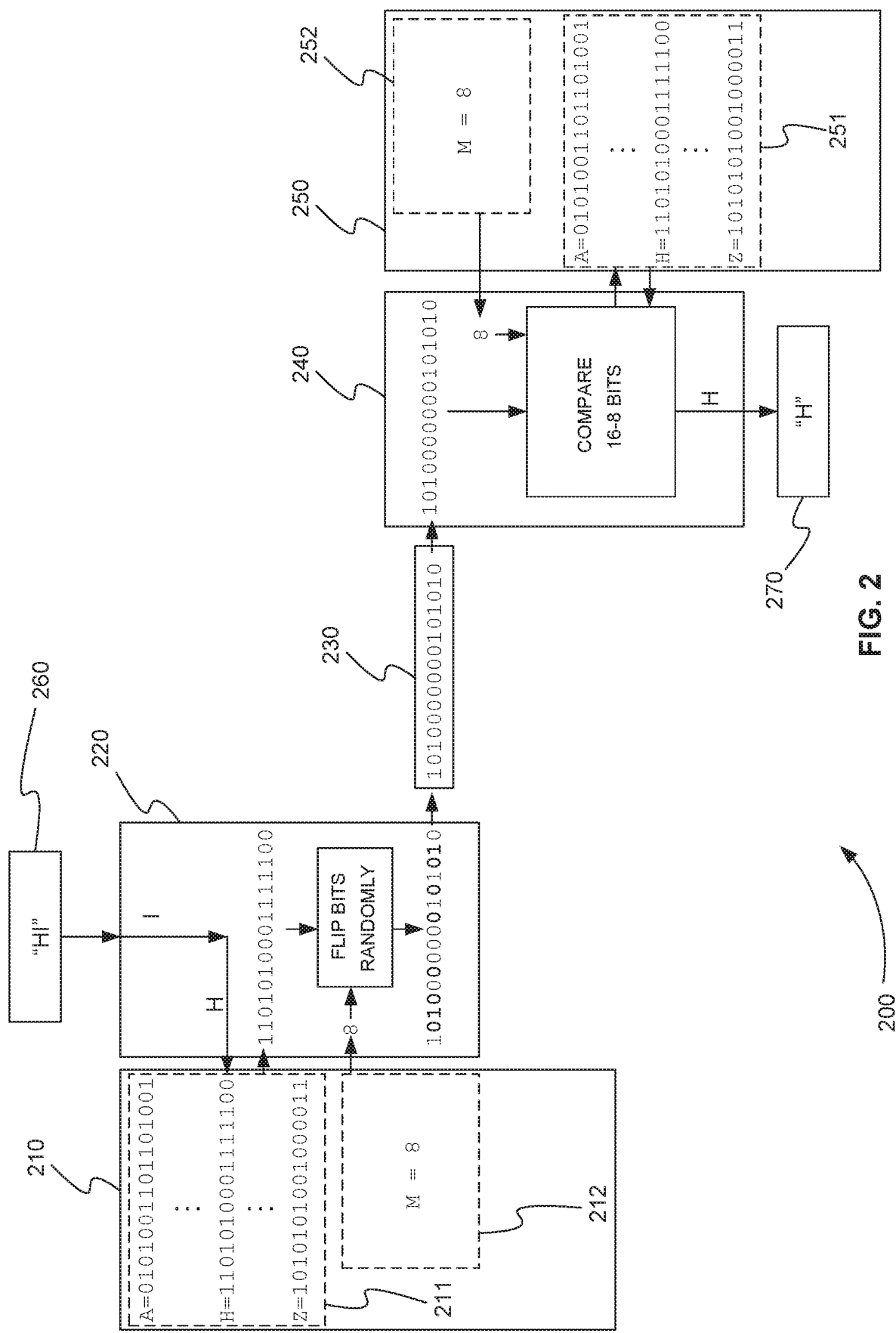
FIG. 2 is a schematic diagram of a system for encoding or encrypting information with randomly flipped bits and transmitting that information through a communications channel, in accordance with various embodiments.

FIG. 2 is a schematic diagram of a system 200 for encoding or encrypting information with randomly flipped bits and transmitting that information through a communications channel, in accordance with various embodiments. System 200 includes first secure memory 210, transmitter 220, communications channel 230, receiver 240, and second secure memory 250.

First secure memory 210 and second secure memory 250 can be any type of memory device including, but not limited to, a solid-state electronic device, a disk drive, or optical device. Transmitter 220 and receiver 240 can be any type of transmitter and receiver used in communications to transmit and receive information. Transmitter 220 and receiver 240 can transmit and receive information through communications channel 230 in digital or analog form. Transmitter 220 and receiver 240 can each include a processor. The processor can be, but is not limited to, a digital signal processor, a computer, a microcontroller, a microprocessor, the computer system of FIG. 1, or any device capable of sending and receiving data and processing data. Communications channel 230 can be any type of communications channel including, but not limited to, a wired or wireless channel and can convey information electrically, electromagnetically, optically, or by sound waves.

First secure memory 210 stores a cipher key 211 that includes for each letter of an alphabet a unique string of binary bits of length N. In FIG. 2, N=16, for example. First, secure memory 210 also stores a total amount of bits M to be randomly flipped (an integer, M) 212 where M<N. In FIG. 2, M=8, for example. In various embodiments, it is preferable to randomly flip 50% of the N bit string. As a result, in various embodiments, M=N/2.

Transmitter 220 receives information message 260 that include a series of one or more letters from the alphabet stored in first secure memory 210. Information message 260 is to be sent from transmitter 220 through communications channel 230 to receiver 240. In FIG. 2, information message 260 is the string "HI," for example.

Transmitter 220 reads cipher key 221 from secure memory 210.

Transmitter 220 then converts at least one letter of the series of one or more letters of information message 260 to a corresponding unique string of binary bits of length N of cipher key 221. For example, in FIG. 2 transmitter 220 converts the letter 'H' of information message 260 to the unique string 1101010001111100 using cipher key 221.

Transmitter 220 also reads the total amount of bits M to be randomly flipped 212 from secure memory 210. For example, in FIG. 2 transmitter 220 reads that 8 bits are to be randomly flipped from secure memory 210.

Transmitter 220 randomly selects M bits of the unique string of binary bits of the at least one letter and flips the M bits of the unique string of binary bits to the opposite binary value. For example, in FIG. 2 transmitter 220 randomly selects 8 bits of the unique string 1101010001111100 representing the letter 'H' and flips the eight bits to the opposite binary value. As shown in FIG. 2, the resulting string of binary bits of length 16 with 8 flipped bits is 1010000000101010, where the flipped bits are shown in bold for illustrative purposes only.

If the resulting string of binary bits and any strings of letters other than at least one letter of the series have exactly N–M bits of the same identity, then this resulting string is discarded and another string with M flipped bits is generated.

For example, in various embodiments, transmitter 220 further compares the resulting string of binary bits of length N constructed by flipping M bits in the N-bits key of one letter (the letter intended for encrypted transmission) of the alphabet read from secure memory 210, with the N bits keys of all other letters. If any such comparison shows that the compared strings have a match of N–M bits being of the same identity (zero or one) then the constructed string is discarded, and a new randomly constructed string is selected by repeating the above sequence. This happens iteratively until the test succeeds, namely, the constructed string has not an exact match of N–M bits of the same identity with any other letters except the letter it was constructed from. In this way, transmitter 220 ensures that receiver 240 is always able to determine the correct letter of the information message.

Transmitter 220 transmits the string of binary bits of length N with M flipped bits of the at least one letter through communications channel 230. For example, in FIG. 2 transmitter 220 transmits the string of binary bits of length 16 1010000000101010 with 8 flipped bits of the letter 'H' through communications channel 230.

Receiver 240 receives the at least one letter of a series of one or more letters of information message 260 from communications channel 230 as a string of binary bits of length N. For example, in FIG. 2 receiver 240 receives the at least one letter of a series of one or more letters of information message 260 from communications channel 230 as string 1010000000101010.

Receiver 240 also reads cipher key 251 and the total amount of bits M to be randomly flipped 252 from a second secure memory 250. Note that cipher key 251 of second secure memory 250 is the same as cipher key 211 of first secure memory 210, and the total amount of bits M to be randomly flipped 252 of second secure memory 250 is the same as the total amount of bits M to be randomly flipped 212 of first secure memory 210.

Receiver 240 decodes or decrypts the received string of binary bits of length N with M flipped bits of the at least one letter. Receiver 240 compares the received string of binary bits to each unique string of binary bits of each letter of cipher key 251. Receiver 240 identifies a letter of cipher key 251 as the at least one letter if N–M bits of a string of the letter of the cipher key match N–M bits of the received string of binary bits. For example, in FIG. 2 receiver 240 compares the received string 1010000000101010 to each unique string of binary bits of each letter of cipher key 251. Receiver 240 identifies the letter 'H' of cipher key 251 as the at least one letter, when 16-8 bits of a string of the letter of the cipher key match 16-8 bits of the received string of binary bits 1010000000101010. Receiver 240, for example, provides the letter 'H' as part of an output information message 270.

Method for Performing BitFlip Encryption

Figure 3:
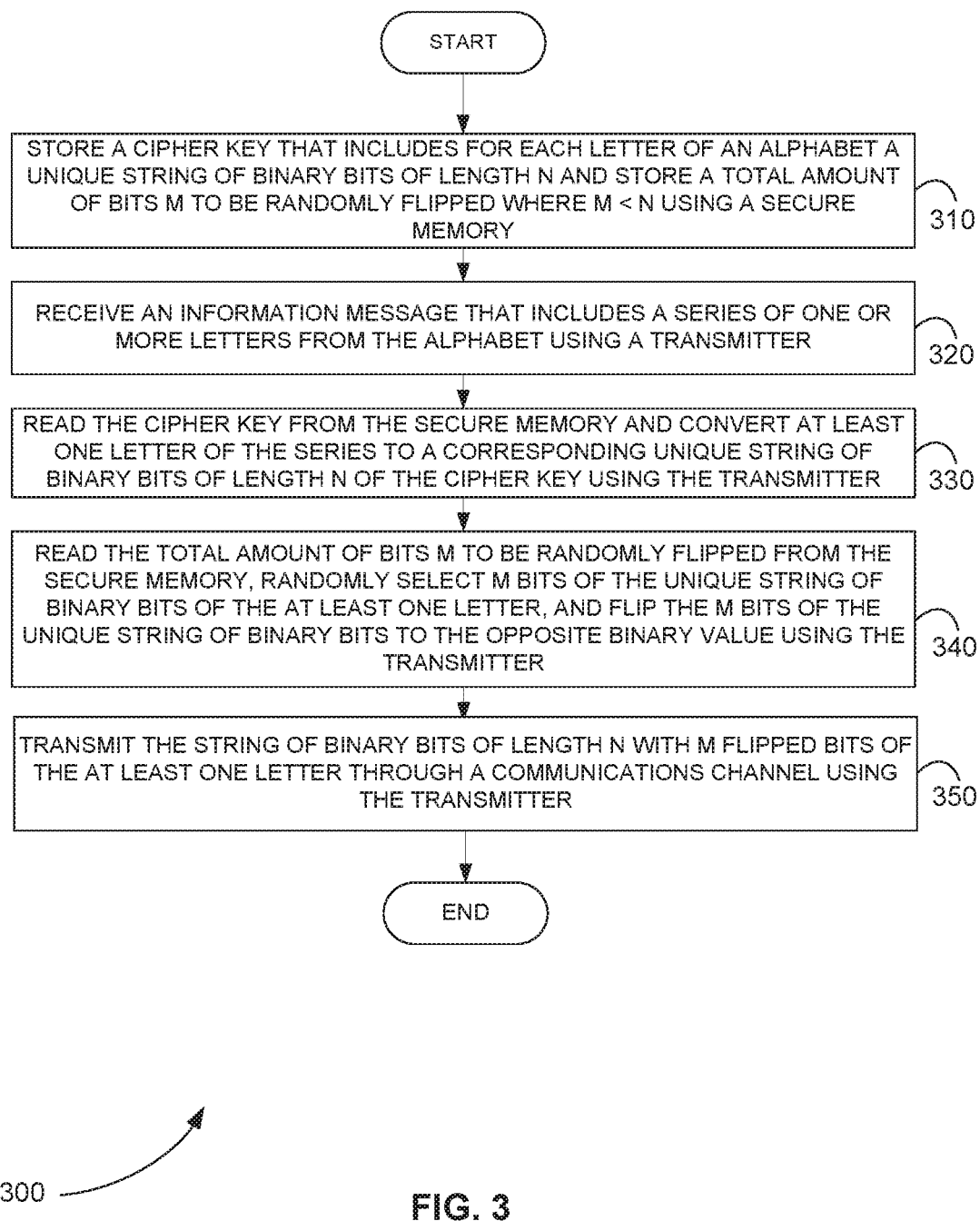
FIG. 3 is a flowchart showing a method for encoding or encrypting information with randomly flipped bits and transmitting that information through a communications channel, in accordance with various embodiments.

FIG. 3 is a flowchart showing a method 300 for encoding or encrypting information with randomly flipped bits and transmitting that information through a communications channel, in accordance with various embodiments.

In step 310 of method 300, a cipher key that includes for each letter of an alphabet a unique string of binary bits of length N and a total amount of bits M to be randomly flipped where M<N is stored using a secure memory.

In step 320, an information message that includes a series of one or more letters from the alphabet is received using a transmitter.

In step 330, the cipher key is read from the secure memory and at least one letter of the series is converted to a corresponding unique string of binary bits of length N of the cipher key using the transmitter.

In step 340 the total amount of bits M to be randomly flipped is read from the secure memory, M bits of the unique string of binary bits of the at least one letter are randomly selected, and the M bits of the unique string of binary bits are flipped to the opposite binary value using the transmitter.

In step 350, the string of binary bits of length N with M flipped bits of the at least one letter is transmitted through a communications channel using the transmitter.

Parallel Encryption

In various embodiments, encryption can be applied in a parallel fashion to some t messages $M_1, M_2, \ldots M_t$. Each message is encrypted using a dedicated alphabet $A_1, A_2, \ldots A_t$. All alphabets are represented with letter keys of the same size, N. All letters are encrypted to bits blocks of size N. This works because any receiver holding the key for alphabet $A_i$ will regard any letter encrypted using any alphabet except $A_i$ as a decoy, as junk, and will disregard it. (Note: using a different alphabet means using a different set of letter keys, to the same or different letters). Only the bit blocks that would evaluate to letters in the $A_i$ alphabet are regarded and properly decrypted so that the receiver holding the key for $A_i$ recovers message $M_i$ without being disturbed by the parallel messages $M_1, M_2, \ldots M_{i-1}, M_{i+1}, \ldots M_t$ that are sent out in parallel. This protocol may be used for ultimate security, broadcasting, access hierarchy, document management efficiency, and deniability and privacy.

There arise circumstances where the plausible message space is very limited, and, in these cases, parallel encryption can achieve ultimate security. Consider a situation where it is well known and anticipated that a message sent from a transmitter to a receiver may be one of k options, where k=2, 3, . . . . This arises when direction is given and the option may be to go right or to go left. It arises when trade instructions are given: buy, hold, sell are the valid options.

In such situations, the transmitter is assumed to have a given shared alphabet with the intended receiver, say $A_1$. The transmitter uses this alphabet to encrypt $M_1$, the message intended for the receiver. But before sending this message over, the transmitter builds additional (k−1) alphabets: $A_2, A_3, \ldots A_k$, and use these (k−1) messages to encrypt all the other (k−1) messages that represent the full scope of plausible messages under the given circumstances. So message $M_i$ is encrypted using alphabet $A_i$. Once done the transmitter mixes the various letters of the k messages with one another, and only make sure that for each message the order of letters that comprise this message is kept in tact. The full mix of the k messages is sent out.

The intended receiver discards all the bit blocks that don't evaluate to proper letters in his alphabet, $A_1$, and evaluates all the letters in message $M_1$ intended to it.

The attacker on his part, first is thoroughly confused, but in the best case from his standpoint, the attacker uncovers all the k alphabets and thereby reads all the k messages. But that would not be helpful at all because without this cryptanalysis the receiver knew that all these k messages are plausible. Since the attacker does not know that the receiver is using alphabet $A_1$ and its respective key, he also does not know that $M_1$ was the message delivered to the receiver. There is nothing in the captured ciphertext that would point to the fact that the receiver is using alphabet $A_1$. This is ultimate secrecy.

Broadcasting & Sequencing

A transmitter packages one stream of bits that includes k messages intended for k receivers (or receiver categories), each using one of the respective alphabets. The message can be broadcast to all the receivers, and each receiver decrypts the ciphertext stream to its own message without being aware how many more messages are communicated in the same stream.

The other mode is sequencing: the transmitter lines up the k intended receivers in some order $R_1, R_2, \ldots R_k$, and passes the entire package that includes all the messages first to receiver one, $R_1$. $R_1$ having alphabet $A_1$ at his disposal, evaluates the message stream to read the message intended to it message $M_1$. Then $R_1$ passes the whole package to recipient $R_2$. $R_2$ discards all the traffic except for the letters intended to him that are part of message $M_2$. $R_2$ then sends the package to $R_3$, and so on until receiver $R_k$ reads his message. This sequencing mode may be practiced in any order. What is important is that every intended receiver sees the package to read the message intended to him.

Access Hierarchy

Parallel messaging may be used in a hierarchy situation where some people are top notch, say category $C_0$, below them are people of category $C_1$, and below them people of category $C_2$, and so on k categories down. The structure dictates that a person in category i can have access to all the material that is duly accessible by people in the lower categories (i+1), (i+2), . . . k. But that category i person should have no access to material reserved for people in the higher categories: (i−1), (i−2), . . . , 0.

This access restriction can be complied with by giving a person in category i the keys to alphabet $A_i, A_i, \ldots A_k$, but not giving him keys for alphabet $A_1, A_2, \ldots A_i$.

It is important to note what is understood in keys for an alphabet. Each intended receiver may be using a different alphabet as long that each letter is associated with letter key of the same length (even this restriction can be alleviated in some circumstances). But then again each intended receiver may be using the very same alphabet, only that each using a different key. So when the text above says a different alphabet the intent is a different key for the letters of the same or different alphabet.

The transmitter could now send a combined message that includes stuff designed to be accessible by different levels. By using BitFlip with the key assignment as above the transmitter insures that each receiver will be reading properly all the information written for him and for lower level receivers, but will not be able to read, interpret any information sent in the very same package to receivers at a higher echelon.

Document Management Efficiency

The above-described message access hierarchy is readily adapted to practice document management. Given an elaborate project where certain information is reserved to higher echelon people, one would maintain the project status using a single document. This single document will be the ciphertext resulting from the access control encryption protocol described above. That document being single will be the only place where revisions, updates and modifications are made. It is that single document that is accessed by all people involved in the project, and each will be restricted to read only what is by design available for him or her to read. The shift from storing a large number of project documents and updating each and every one of them every time some project parameter changes, is a big efficiency boost. Maintaining one document versus updating many is very consequential in the life of any involved project.

Deniability and Privacy

Parties may wish to hide the contents of their communication vis-a-vis a coercive authority that could force them to disclose their encryption keys. To do so the parties use two alphabets, namely two keys which may be used for the same alphabet. One alphabet key is used to send the secret message, and the other is used to send the decoy message. Upon demand to expose the key the parties reveal the key that interprets the captured ciphertext to the decoy message and keep the secret message hidden.

Zero Leakage Communication

The BitFlip cipher described here allows the receiver to quickly distinguish between information that is meaningless and should be discarded and other information that is meaningful and part of the message for its attention. This very fact can be used by a pair of transmitters and receivers to create a zero leakage environment where no attacker is able to determine whether the two parties are talking to each other, at what frequency volume, balance, etc. There is no leakage.

Before describing how it works, a few words on its importance. Hackers today glean oodles of inferential 'gold' from following the pattern of communication between certain parties of interest. When two companies plan to team up, for example, the level, intensity, and duality of their message traffic reflects it to anyone watching even if the watcher is defeated by the cipher used and is contents-clueless. The same applies for personal matters, intelligence gathering, national security, and privacy protection. So masking the pattern of communication may be a critical capability.

With BitFlip this is done through the following protocol. The transmitter and the receiver decide on a bit flow rate between them. Say a rate of r bits/second. The transmitter then invokes a high quality randomness source, and generates r bits/seconds random bits, and lines them up to send them towards the receiver on a shared insecure channel. Before sending the bits the transmitter chops them to blocks where each block is the size of the letter key. Every such block, in turn, is evaluated against the t letter keys in the shared alphabet between the transmitter the receiver. If a block is evaluated to be exactly f bits away from any of the t letter keys in the shared alphabet, then this block is discarded—not sent. The transmitter then evaluates the next block in the random stream, and discards it too if it by chance appears to represent a letter in the shared alphabet. Doing so block by block, the transmitter will end up sending only blocks that categorically don't evaluate to any letter in the shared alphabet. This practice reduces the effective rate of bits per seconds sent to the transmitter, and therefore the receiver might have to increase the rate of generated randomness so that the net flow rate to the transmitter will be r bits per second.

This is a mode of no communication because the transmitter is not saying anything to the receiver, it just sends a barrage of meaningless bits. The receiver takes in those random bits and evaluates them block by block, where a block is of the size of letter key of the cipher. Each block is evaluated against the alphabet key. Namely, the receiver takes in an incoming block b and checks whether it represents a letter key in its alphabet. As the transmitter has already scrubbed all the blocks that by chance evaluate to a letter in the shared plaintext alphabet, it is guaranteed that the receiver will discard ALL the bits coming its way.

For an outsider reading the bit flow from transmitter to receiver without awareness of the shared alphabet key each block is a suspect letter. There is no mathematical way for the observer to conclude that all the stream of bits from transmitter to receiver is meaningless.

At some point of time the transmitter wishes to communicate to the receiver a message M. The receiver writes M using the shared plaintext alphabet, and then uses ad-hoc randomness to communicate M letter by letter, such that each letter is communicated through a bit string of the letter key size, and which is f bits flipped compared to the respective letter key. If M is comprised of m letters, and each letter key is comprised of n bits, then the transmitter encodes M using m blocks of bits each block is of size n bits, all together m×n bits. When this is done the transmitter has lined up m blocks of n bits each. Once these m blocks are passed on to the receiver, the receiver is able to decipher them block by block because she shares the same alphabet key with the transmitter.

The next step is for the transmitter to disperse the m message blocks within the random flow of r bits/second. What is important that the m message blocks are kept in the original order. Otherwise, their dispersion is immaterial. Let $r_1, r_2, \ldots$ be consecutive n-bits blocks in the flowing random stream from the transmitter to the receiver. Let $m_1, m_2, \ldots$ be the ordered letters that comprise M. The transmitter now sends the receiver a dispersed stream like:

$$r_1, \ldots r_i, m_1, r_{i+1}, \ldots r_j, m_2, r_{j+1}, \ldots r_k m_3 r_{k+1}$$

And so on until the message M is delivered to the receiver letter by letter. The receiver on its part evaluates the incoming stream block by block (each block comprised of n bits), discards the meaningless blocks and regards the meaningful blocks and thereby recovers M from the stream letter by letter.

The hacker on his part is unaware that the random stream that he observes now includes a meaningful message. There is no detectable change in the stream. That is because inherently BitFlip encrypted letters are perfectly random. To recall: the key for each letter is randomly selected, the selection of f bits to flip in the key is randomly selected too, so that result is perfectly random.

Using this protocol the transmitter could send as many messages as desired, but with a limit on the flow rate determined by the arbitrarily selected r bits/second masking flow rate. That agreed upon rate can be increased at will to accommodate the desired communication rate. In fact, the decision to up the masking flow rate of random bits per second can be taken unilaterally by the transmitter. The receiver detects it and reacts.

Note that this protocol hides the information about the length of M the frequency of sending messages, and whether or not they are in a dialogue mode with the receiver. The latter is because the receiver can establish a symmetric configuration for his counter messages to the transmitter. In other words, each of the communicating parties serves both as a transmitter and a receiver and so create a perfect zero leakage regimen regarding the communication between the two parties.

Adaptive Defense

Techniques are provided to address a chosen plaintext attack, a payload sensitivity adjustment, and an aging key strategy.

The principle behind the protocols to handle these challenges is the same: exploiting the attribute of BitFlip to readily distinguish between meaningful information and meaningless (decoy) information. This ability of the key holder versus the inability of the non-key holder gives rise to the following solution protocols.

Chosen Plaintext Attack

A chosen plaintext attack is an attack in which an attacker will repeatedly get the transmitter to encrypt the same letter over and over again. It is a mathematical fact that with sufficient instances of strings that are all f bits flipped relative to the letter key of the repeated key, it is possible to write a system of linear equations that would dig out the identity of the secret letter key.

To frustrate such an attacker, the transmitter intersperses with the bona fide encrypted letters a variable count of junk, garbage letters. The intended receiver readily discards these junk bits but the attacker will not distinguish between them and the bona fide bits, and use all the output in his mathematical evaluation of the system of linear equations to chase down the letter key of the repeated letter. By sending sufficient junk, (decoy) the transmitter frustrates even the smartest attacker. Suppose an attacker manages to get the transmitter to send encrypt t times the letter A. Normally the transmitter sends out w blocks of size n bits each, where each block is f bits different from the A key (which is also n bits long). These w blocks serve to extract the A key. But the transmitter might intersperse the w blocks with extra q blocks of garbage random bits. Now the attacker will have (q+w) blocks to analyze. While the attacker might know the values of w and q, there are too many combinations to mark w blocks out of (q+w). And while the attacker may control the value of w, the value of q is totally under the writer control. And since the message writer (the transmitter) is aware of w, he can adjust q to be of sufficient measure to frustrate its attacker.

In practice, it is not likely that an attacker will cause a cipher user to send the same letter over and over again. Rather the attacker will immerse the target letter in other text. In that case, the attacker will not even know if the extra bits sent out is in response to repeat encryption of the target letter or on repeat use of another letter.

Payload Sensitivity Adjustment

Using, say AES, the security attached to all encrypted text is the same, whether the protected text is innocuous or critical. Using BitFlip the transmitter has the power to adjust the security to the sensitivity of the payload, the protected plaintext.

This adjustment is carried out by mixing random bits within the proper message bits. The more such decoy bits are sent out the more difficult is it for the attacker to crack the cipher. And thus a transmitter who wishes to send message M comprised of M-top-secret, M-secret, and M-classified, will adjust the practical protocol to use large number q decoy blocks to be mixed with the letters that comprise M-top-secret, and fewer q' decoy blocks to mix M-secret in, and then fewer q" decoy block to protect M-classified.

Since all blocks look the same to the hacker, the hacker will not even be aware that some of the message stream is a highly protected M-top-secret, while the rest is of lower security.

Aging Key Strategy

Communicating parties have to take into account that their hacker has accumulated all the ciphertext used with the current key for the purpose of cracking it. It is good practice to change the key every so often, then the attacker may not know that a given body of ciphertext was produced using one key or another. But if the attacker rightly suspects that a given key was not changed, and a given body of ciphertext all traces back to the same key, then the user could protect the subsequent messages encrypted over that key by increasing the flow of decoys. The more decoys, meaningless blocks, the more difficult it is to crack the cipher. So the protocol may include a built-in aging adjustment. As the key is aging the level of decoy interjection is going up.

The flip side of this strategy is that more and more bits need to be sent out to communicate a given message, but that is a reasonable price to pay in a situation where for some reason the key cannot be easily changed.

Generating Randomness

The procedures and tools described herein all rely on ad hoc supply of high-quality randomness. This can be done using a novel technology in which quantum processes are used to generate a quantum quality stream of random bits. One example is the IDQ company in Geneva Switzerland which if offering commercially available 5 mm size chips that produce several megabytes per second of random bit flow. The bits are generated through a subatomic process, in this case, a single photon that is shot against a slanted half way mirror and that has a 50:50 chance to go through or bounce off. The result is captured in a binary series. Others offer radioactive decay based "pure" randomness. Less sophisticated devices rely on white noise or other real-life fluctuations that are translated into a random bit series.

The cheapest and most common way to generate randomness is through algorithmic processes. Such solutions carry the vulnerability of the algorithm being mathematically hacked. But also they carry the vulnerability of having some stretches of bits with poor randomness, an inherent vulnerability.

In various embodiments, a randomness filter can be used in conjunction with algorithmic randomness as well as with noise, real processes, and quantum randomness. It is based on a novel way to rate and gauge randomness. The method will fast determine if an incoming stream of purported randomness has weak randomness sections, and if it finds such weak places, it simply discarded them, and passes (filters) out only random bits which are very random and unpredictable. By employing this filter it is possible to use relatively low quality randomness source and apply the filter to clean it and insure a high-quality random sequence for the various processes herein.

Randomness Filter

An electronic circuitry takes in mixed quality randomness (a bit stream), and scrubs it from sections that exhibit poor randomness. The output of the device is a high-quality randomness, regardless of the original source.

The device operates on a new method to rate and gauge randomness, a method which allows for fast computation and determination of randomness quality. It is based on the idea that the opposite of randomness is symmetry and order. A bit string which is symmetric with respect to a basic operation is clearly not random. So given some bit string of size s bits, the device will check to see what is the number of symmetric strings that together can form the s bits string. If the examined string can be constructed from a small number (and hence large) symmetric substrings then it is poorly random (highly symmetric). If on the other hand the smallest number of symmetric substrings that can construct the examined string is large, then it means that it takes a large number of small symmetric substrings to assemble the examined string, which in turn means that the string is highly randomized. This symmetric string evaluation is computationally fast and it issues a randomness quality index on a randomness stream block by block. Any block found to be under par is discarded. Only a block of s-bits strings that compute to be of high quality are passing through. The net result is that regardless of the quality of randomness generator, the output is of high quality.

This filter also allows a user to mix untested and hence unknown algorithmic sources to generate randomness. Normally users limit themselves to pseudo-random number generators that the academic community has studied to determine their relative quality. Alas, those, so-called approved algorithms are few and well known to the established cryptanalysis shops who invest in cracking them. The use of the randomness filter allows one to use an algorithmic randomness source that is not widely known, and not likely to have been cracked since any lapse in randomness quality therein will be filtered out by this randomness filter.

All in all, the randomness filter contributes to the availability of high-quality versatile randomness sources, which are so critical and getting more so when it comes to cyber security.

Relationship with Quantum Computing and Artificial Intelligence

The tools, methods, and procedures described herein are based on Turing machines with optional quantum generation of randomness. Yet, these procedures amount to an approximation of quantum computing.

Essential to various embodiments is the concept of the virtual qubit. Quantum computing is based on qubits which are entities interpreted as a state of superposition between the state of zero and the state of one. The quantum computer is based on maintaining a group of bits in quantum coherence—coherent superposition in which they operate as a large number of parallel computing machines. The superposition of a qubit is collapsing to either zero or one, upon interaction with the observer. In various embodiments, in a typical application, a string comprised of $2n$ bits undergoes half-way flipping. That means that exactly n (half) bits are off their identity in the pre-flipped string. When such flipped string is released into the insecure channel, it is being observed by strangers who may know how this string was generated, but are clueless as to which of the $2n$ bits in the string has been flipped. Each bit in the string has the same chance to be what it is written and to be the opposite. This means that the observer of the bit-flipped string is viewing its $2n$ bits as if they were 2n qubits, and hence, they exude the same uncertainty that comes across from qubits. This inherent uncertainty is the foundation of the BitFlip security. To complete the security of the flipped string it is important to insure that the choice of which n bits to flip is made completely randomly. And that is where the quantum source of randomness described above comes into play. These bit-flipping procedures require a great deal of ad-hoc randomness, and the quantum chip will provide it. For small inexpensive IoT devices for which the quantum source is too expensive, the solution might be in the form of either noise production of randomness or in the form of algorithmic production. For either source, various embodiments provide an effective filter that will scrub the randomness stream from bad (non randomized) sections to insure high-quality randomness input.

The methods of imprinting a silent signature on data is an approximation of the quantum finger printing where any one who touches the quantum data leaves his mark. Here too every receiver of a body of data is signing it in a way that opens for subsequent accounting of this action, This bitflipping is further approximating quantum machines in as much as it is a-priori secure against the violent brute force attack to be offered by the emerging quantum machines. This security is based on robust combinatorics which can tie the security of a bit-flipping cipher to the raw count of involved bits. And by increasing the size of the flipped bit strings one increases the security of its cipher, even against powerful quantum computing. This linear upgrading of security will continue upwards up to Vernam levels—mathematical security.

By applying the randomness filter to insure a high quality of randomness in sufficient quantities it is possible to almost simulate quantum procedures with Turing machines. And as quantum computers still face years of engineering difficulties, the idea of approximating quantum capabilities with well known Turing machines appears prudent and attractive.

Various embodiments, anticipate the advent of artificial intelligence by designing protocols that lend themselves to AI reasoning. This applies to matching security needs to security measures by determining how much randomness to use for each communication, by deciding on defensive steps to be taken when attacked.

BitFlip Parallel Encryption

Figure 4:
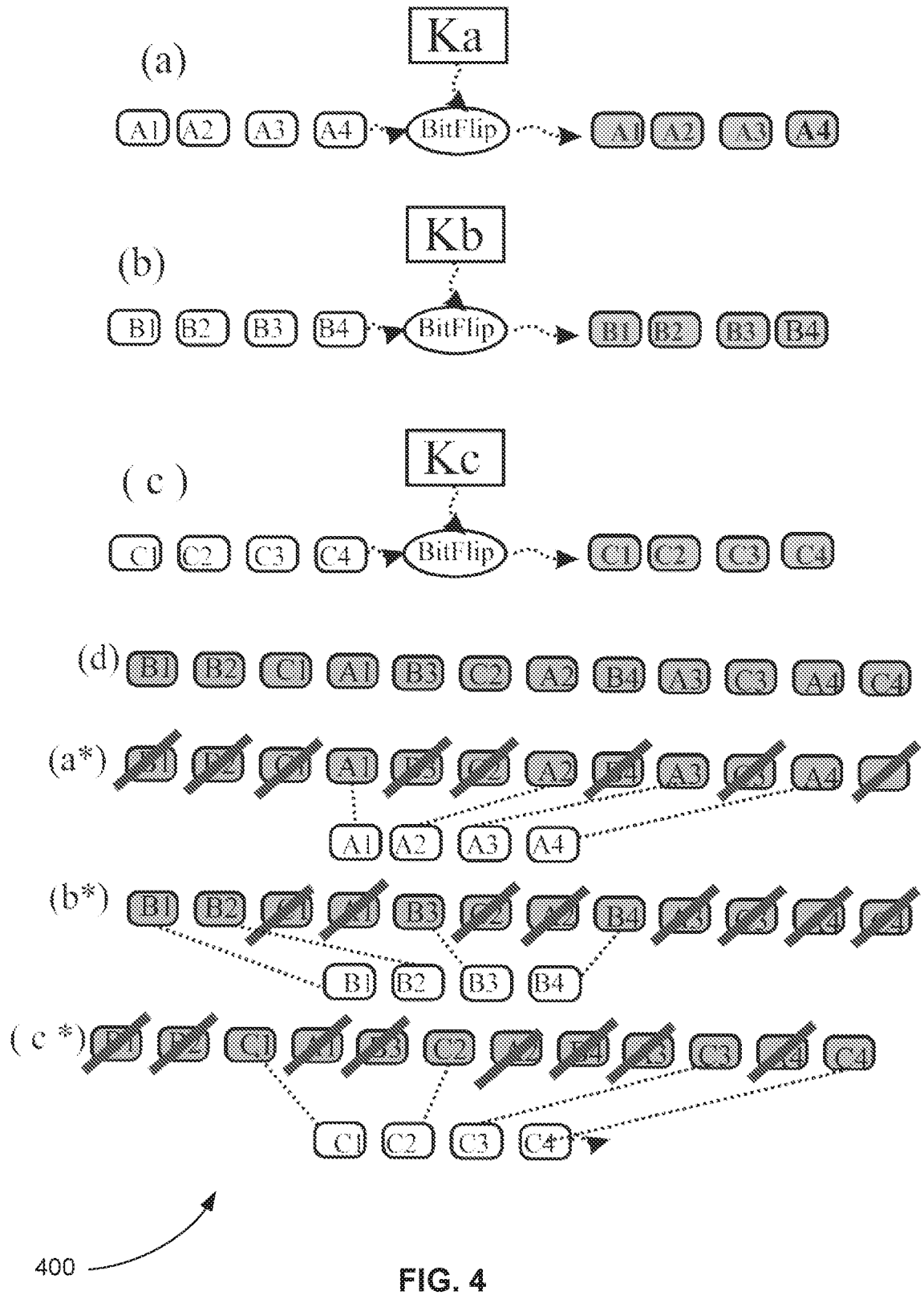
FIG. 4 is diagram depicting the use of BitFlip to encrypt three messages in parallel, in accordance with various embodiments.

FIG. 4 is diagram 400 depicting the use of BitFlip to encrypt three messages in parallel, in accordance with various embodiments. Message (a) is written for receiver A and is comprised of the following letters A1, A2, A3, A4. The message is fed into a BitFlip cipher that is feeding of a key Ka shared with receiver A. The result is the encrypted message letter by letter: A1, A2, A3, A4. The encrypted message is shown in darkened letters. A similar set up is put forth for the connection with receiver B (b) to whom the transmitter wishes to write the message B1, B2, B3, B4, and which is encrypted using BitFlip feeding of key Kb shared with receiver B. The very same happens between the same transmitter and receiver C: message C1, C2, C3, C4 is encrypted using key Kc, the shared key with receiver C (c). The transmitter then mixes the encrypted letters from the three messages by any order, except that the internal order for each receiver is kept. Namely, letter A1 preceded A2, which preceded A3, which precedes A4.

However between any two of these letters can be any number of letters from another message. The same is true for the messages for receivers B and C. The resultant is a string of encrypted letters shown in (d).

Each of the three receivers receives the same string of encrypted letters (d). However, each receiver discards the letters that don't decrypt to any letter by his or her key. Line (a*) depicts this situation for receiver A: all the letters in (d) that when tested against Ka don't evaluate to any letter in A's alphabet are discarded. What is left is only the letters A1, A2, A3, A4 encrypted, in the right order. Receiver A will decrypt them using Ka and properly read the message sent to him by the transmitter. Receiver A will not be aware as to whether the discarded letters are just noise, or amount to a different message sent to a different receiver using a different key. Respectively receivers B and C will process the very same string of decrypted letters (d), and each of them will discard all the letters except what is intended for him or her.

BitFlip Cipher Chip

Figure 5:
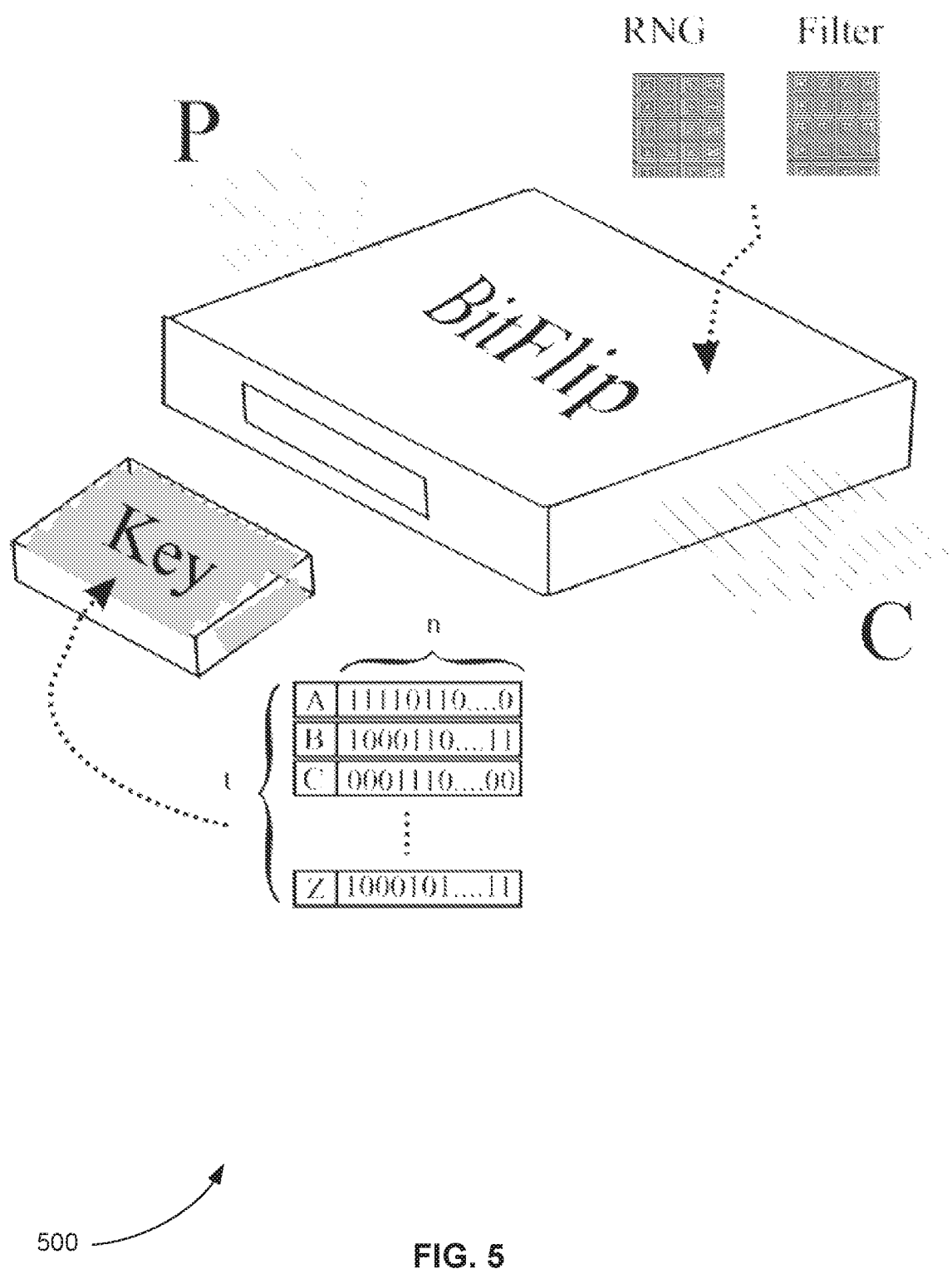
FIG. 5 is diagram that shows a hardware implementation of the BitFlip cipher, in accordance with various embodiments.

FIG. 5 is diagram 500 that shows a hardware implementation of the BitFlip cipher, in accordance with various embodiments. A unit that may be fixed and powered on any electronic board with contact points for feeding in the plaintext (P) and contact points for outputting the ciphertext (C). The chip has a slit where one latch in the BitFlip key. The key module is shown (Key) and the graphics next to it illustrates that the key is comprised of randomized sequences of n bits associated each with each of the t letters in the alphabet used for the communication. The figure also illustrates that the chip contains a randomness source (RNG), which may be a quantum-grade randomness generation, as we already have the technology to fit small randomness generators in a chip, or the randomness generator may be white noise or even algorithmic. The figure also shows that whatever the source of the randomness it is passed through a randomness filter which outputs a high-quality randomness stream for the BitFlip cipher.

BitFlip Auditing of Data Transmission

Figure 6:
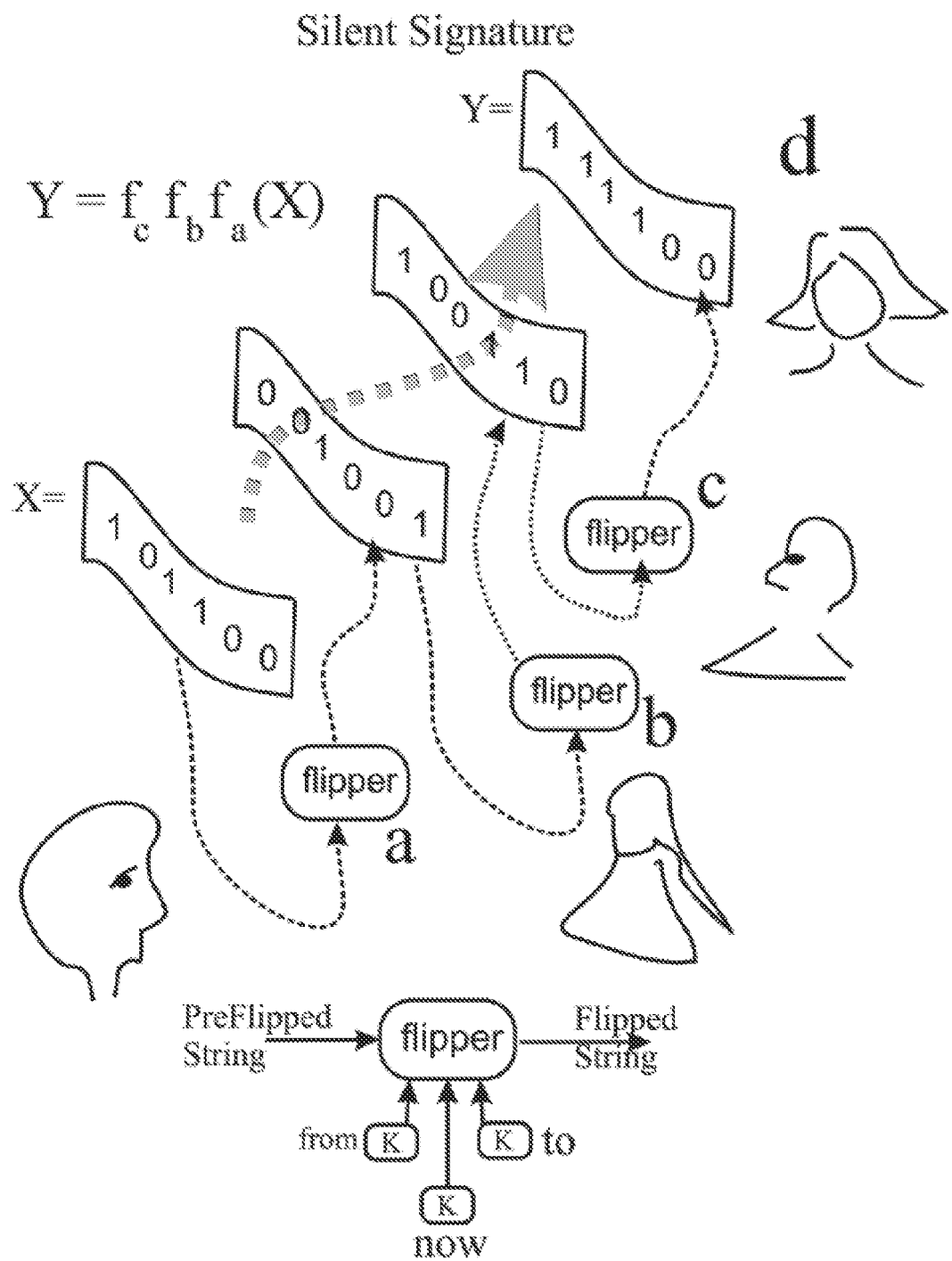
FIG. 6 is diagram that shows a transmitter communicating information X to receiver, in accordance with various embodiments.

FIG. 6 is diagram 600 that shows a transmitter (a) communicating information X to receiver (b), in accordance with various embodiments. The information carried by X is captured by the number of bits in X (in the example it is 6 bits, so the number 6 is communicated from a to b). Since the identity of the bits in X does not play a role in the determination of the information carried by X, these bits can be flipped. Transmitter (a) has a 'flipper' function with a well-defined flipping algorithm that in the illustrated case flips 3 bits from the original X=101100 to X'=001001, and then transmitting X' to (b). (b) on his part wishes to transmit X' (which has the same value as X=6) to receiver (c). But before doing so (b) applies his 'signature flipper' function to flip 5 bits to generate X"=100110. Again the transmitted value is the same: X"=X'=X=6). (c) does the same forward towards (d). (c) uses its signature flipper to flip 3 bits from X" to X'''=Y.

An inspector would easily trace back the history of the transmittance of X. With the knowledge of the flipping function of all involved the inspector could verify that given the identities of the bits in X as held by the transmitter (a), the flipping function of a would generate X' to be sent to (b), and when (b) passes X'-X to (c) he flips X' to X" using his private flipping function and so on to (d). The bit identities in X and Y are consistent with the flipping functions for (a), (b), and (c). Which proves that the same message was passing through the so identified holders. A chain of custody has been proven.

The flipper may be a generic algorithm operating on the basis of the input (pre-flipped) string, on the identity mark (key) of the flipper (the "now" key), on the identity mark of the transmitter who passed the data (X) to the current holder, the "from" key, and on the identity mark of the receiver of this data element X, the "to" key.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for encoding information with randomly flipped bits and transmitting that information through a communications channel, comprising:

a secure memory that stores a cipher key that includes for each letter of an alphabet a unique string of binary bits of length N and stores a total amount of bits M to be randomly flipped where M<N; and a transmitter that receives an information message that includes a series of one or more letters from the alphabet, reads the cipher key from the secure memory and converts at least one letter of the series to a corresponding unique string of binary bits of length N of the cipher key, reads the total amount of bits M to be randomly flipped from the secure memory, randomly selects M bits of the unique string of binary bits of the at least one letter, and flips the M bits of the unique string of binary bits to the opposite binary value, and transmits the string of binary bits of length N with M flipped bits of the at least one letter through a communications channel.

2. The system of claim 1, wherein the transmitter transmits the string of binary bits through the communications channel to a receiver and wherein the receiver reads the cipher key and the total amount of bits M to be randomly flipped from a second secure memory and decodes the received string of binary bits of length N with M flipped bits of the at least one letter by comparing the received string of binary bits to each unique string of binary bits of each letter of the cipher key, and identifying a letter of the cipher key as the at least one letter if exactly N-M bits of a string of the letter of the cipher key match N-M bits of the received string of binary bits.

3. The system of claim 1, wherein M=N/2.

4. The system of claim 1, wherein before transmitting the string of binary bits through a communications channel, the transmitter further compares the resulting string of binary bits of length N with M flipped bits to the cipher key to determine if the resulting string of binary bits and any strings of letters other than at least one letter of the series have exactly N-M bits of the same identity.

5. The system of claim 4, wherein if the resulting string of binary bits and any strings of letters other than at least one letter of the series have exactly N-M bits of the same identity, the transmitter iteratively randomly reselects M bits of the unique string of binary bits of the at least one letter and flips the M bits of the unique string of binary bits to the opposite binary value until the resulting string of binary bits and all strings of letters other than at least one letter of the series do not have exactly N-M bits of the same identity.

6. A system for receiving information with randomly flipped bits from a communications channel and decoding that information, comprising:

a secure memory that stores a cipher key that includes for each letter of an alphabet a unique string of binary bits of length N and stores a total amount of bits M to be randomly flipped where M<N; and a receiver that receives at least one letter of a series of one or more letters of an information message from a communications channel as a string of binary bits of length N, reads the cipher key and the amount of bits M from the secure memory, and decodes the received string of binary bits of the at least one letter of the series by comparing the received string of binary bits to each unique string of binary bits of each letter of the cipher key and identifying a letter of the cipher key as the at least one letter of the series if exactly N-M bits of the letter of the cipher key match N-M bits of the received string of binary bits.

7. The system of claim 6, wherein M=N/2.

8. The system of claim 6, wherein the string of binary bits received by the receiver are transmitted to the communications channel by a transmitter and wherein the transmitter reads the cipher key from a second secure memory, converts the at least one letter to a corresponding unique string of binary bits of length N of the cipher key, reads the total amount of bits M to be randomly flipped from the second secure memory, randomly selects M bits of the unique string of binary bits of the at least one letter, and flips the M bits of the unique string of binary bits to the opposite binary value before transmitting the string of binary bits of length N with M flipped bits through the communications channel.

9. The system of claim 8, wherein before transmitting the string of binary bits through a communications channel, the transmitter further compares the resulting string of binary bits of length N with M flipped bits to the cipher key to determine if the resulting string of binary bits and any strings of letters other than at least one letter of the series have exactly N-M bits of the same identity.

10. The system of claim 9, wherein if the resulting string of binary bits and any strings of letters other than at least one letter of the series have exactly N-M bits of the same identity, the transmitter iteratively randomly reselects M bits of the unique string of binary bits of the at least one letter and flips the M bits of the unique string of binary bits to the opposite binary value until the resulting string of binary bits and all strings of letters other than at least one letter of the series do not have exactly N-M bits of the same identity.

11. A method for encoding information with randomly flipped bits and transmitting that information through a communications channel, comprising:
  storing a cipher key that includes for each letter of an alphabet a unique string of binary bits of length N and storing a total amount of bits M to be randomly flipped where M<N using a secure memory;
  receive an information message that includes a series of one or more letters from the alphabet using a transmitter;
  reading the cipher key from the secure memory and converting at least one letter of the series to a corresponding unique string of binary bits of length N of the cipher key using the transmitter;
  reading the total amount of bits M to be randomly flipped from the secure memory, randomly selecting M bits of the unique string of binary bits of the at least one letter, and flipping the M bits of the unique string of binary bits to the opposite binary value using the transmitter; and
  transmitting the string of binary bits of length N with M flipped bits of the at least one letter through a communications channel using the transmitter.

12. The method of claim 11, further comprising transmitting the string of binary bits through the communications channel to a receiver, reading the cipher key and the total amount of bits M to be randomly flipped from a second secure memory using the receiver, and decoding the received string of binary bits of length N with M flipped bits of the at least one letter using the receiver by
  comparing the received string of binary bits to each unique string of binary bits of each letter of the cipher key, and
  identifying a letter of the cipher key as the at least one letter if N-M bits of a string of the letter of the cipher key match N-M bits of the received string of binary bits.

13. The method of claim 11, wherein M=N/2.

14. The method of claim 11, wherein before transmitting the string of binary bits through a communications channel, comparing the resulting string of binary bits of length N with M flipped bits to the cipher key to determine if the resulting string of binary bits and any strings of letters other than at least one letter of the series have exactly N-M bits of the same identity using the transmitter.

15. The method of claim 14, wherein if the resulting string of binary bits and any strings of letters other than at least one letter of the series have exactly N-M bits of the same identity, iteratively randomly reselecting M bits of the unique string of binary bits of the at least one letter and flipping the M bits of the unique string of binary bits to the opposite binary value until the resulting string of binary bits and all strings of letters other than at least one letter of the series do not have exactly N-M bits of the same identity using the transmitter.

* * * * *